(12) United States Patent
Brownjohn

(10) Patent No.: US 7,237,965 B2
(45) Date of Patent: Jul. 3, 2007

(54) FIBRE OPTIC CONNECTOR

(75) Inventor: Nicholas Brownjohn, Buxtehude (DE)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/554,990

(22) PCT Filed: Apr. 29, 2004

(86) PCT No.: PCT/GB2004/001858

§ 371 (c)(1),
(2), (4) Date: Oct. 31, 2005

(87) PCT Pub. No.: WO2004/097484

PCT Pub. Date: Nov. 11, 2004

(65) Prior Publication Data

US 2006/0239620 A1    Oct. 26, 2006

(30) Foreign Application Priority Data

May 2, 2003  (GB) .............................. 0310206.8
May 7, 2003  (EP) .............................. 03252861

(51) Int. Cl.
*G02B 6/38* (2006.01)
(52) U.S. Cl. ............................ 385/71; 385/53; 385/55; 385/70
(58) Field of Classification Search ................ 385/53, 385/55, 70, 71
See application file for complete search history.

(56) References Cited

U.S. PATENT DOCUMENTS

| | | | |
|---|---|---|---|
| 2,962,688 A | 11/1960 | Werner | |
| 4,645,295 A | 2/1987 | Pronovost | |
| 5,202,949 A | 4/1993 | Hileman et al. | |
| 5,408,557 A * | 4/1995 | Hsu | ............................ 385/72 |
| 5,757,996 A | 5/1998 | Vine | |
| 5,971,625 A | 10/1999 | Lu | |
| 2002/0097964 A1 | 7/2002 | Roehrs et al. | |

FOREIGN PATENT DOCUMENTS

EP    0 414 438 A3    2/1991

OTHER PUBLICATIONS

Sjogren, "Manufacturing technique for embedding detachable fiber-optic connections in aircraft composite components," *Smart Mater. Struct.*, vol. 9, pp. 855-858 (2000).

* cited by examiner

*Primary Examiner*—Jennifer Doan
(74) *Attorney, Agent, or Firm*—Patterson, Thuente, Skaar & Christensen, P.A.

(57) ABSTRACT

A fibre optic connector assembly includes first and second parts (1, 2) that can be physically connected together and separated from one another. Each connector part (1, 2) including a plurality of fibres (3, 4), each for optical connection to a respective fibre of the other part. A housing (8) is provided within the assembly, the housing defining a plurality of passageways for housing respective optical connections of the fibres (3, 4) of the first and second connector parts (1, 2) and for maintaining the fibres of each each optical connection in alignment. The housing (8) is tethered to the first connector part (1) by an elongate flexible member (15).

18 Claims, 3 Drawing Sheets

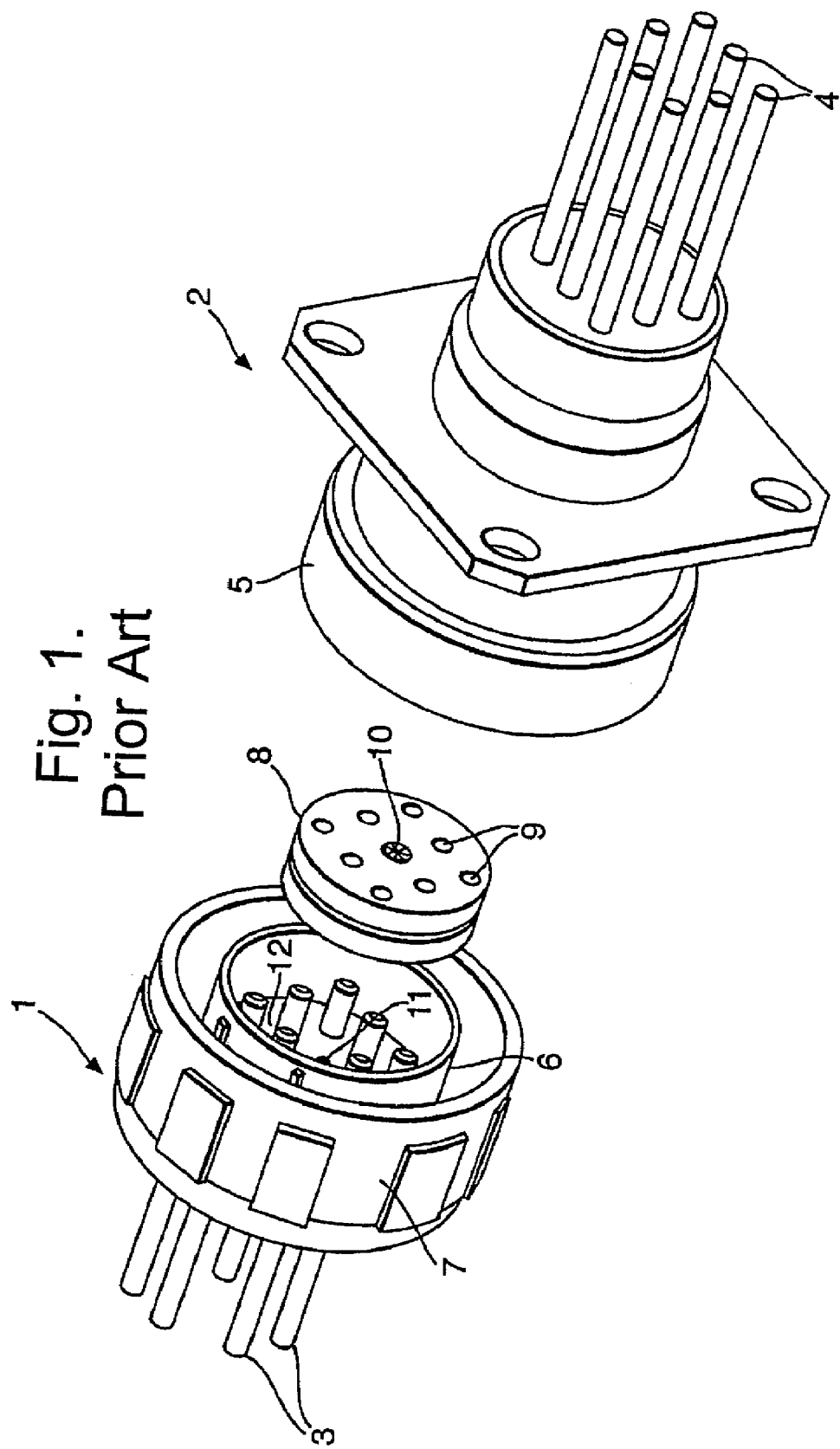

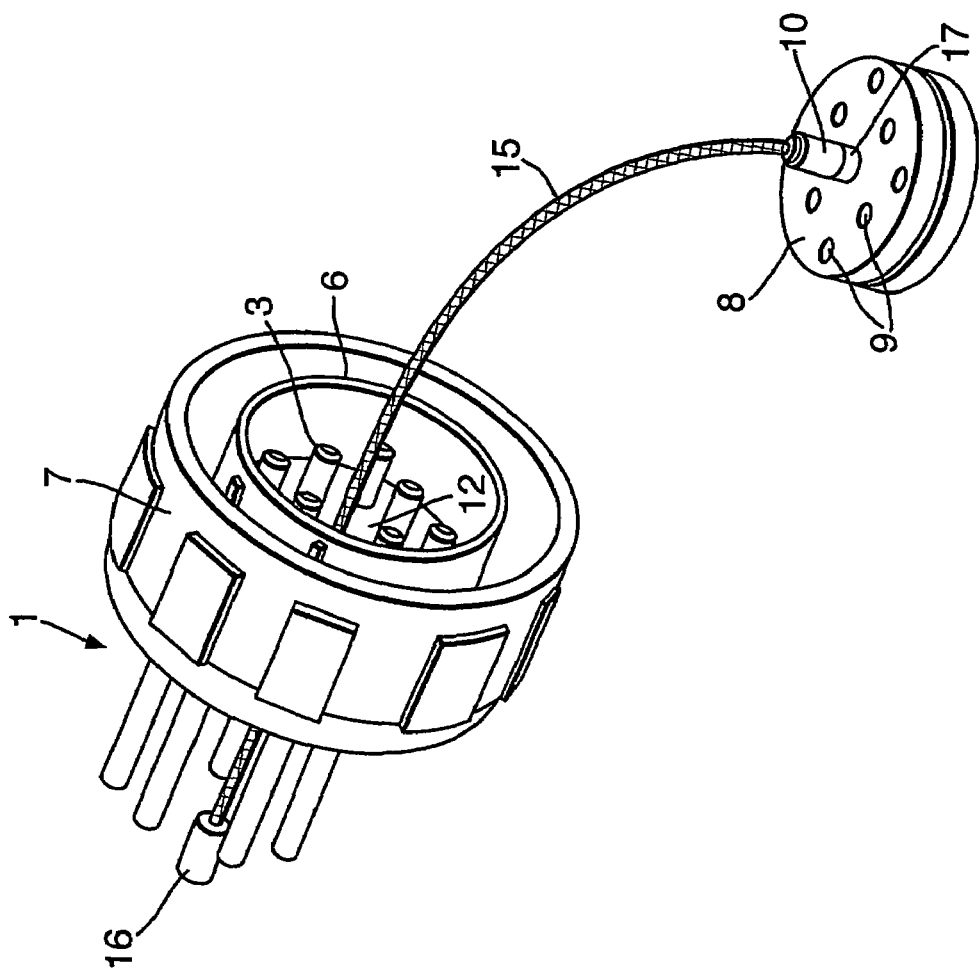

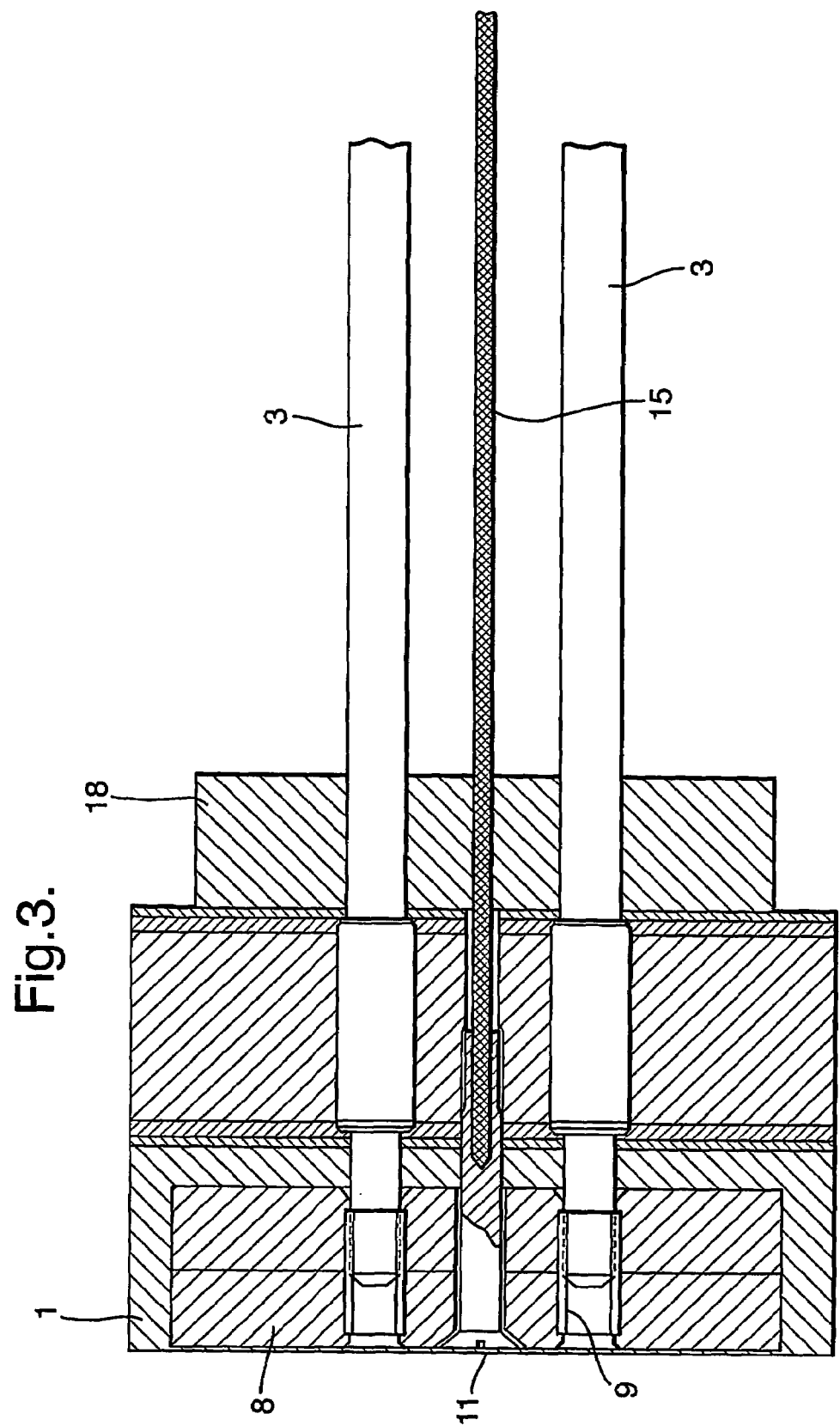

FIBRE OPTIC CONNECTOR

This invention relates to a fibre optic connector assembly and more particularly to a fibre optic connector assembly that includes first and second connector parts that can be physically connected together and separated from one another, each connector part including a plurality of fibres each for optical connection to a respective fibre of the other part.

In order to align fibres that are to be optically connected together, it has been proposed to provide a housing within the assembly with the housing defining a plurality of passageways for housing respective optical connections of the fibres of the first and second parts and for maintaining the fibres of each optical connection in alignment at the optical connector.

In an assembly of the kind proposed above the optical connections are contained within the housing and are therefore not readily accessible for cleaning or other maintenance purposes. In order to overcome that problem it has been proposed to make the housing containing the optical connections removable so that the connections become readily accessible. An arrangement of this kind is described in U.S. Pat. No. 5,757,996.

In the assembly described in U.S. Pat. No. 5,757,996, the fibre optic connector assembly has two parts which can be physically connected together and separated from one another. Each of the first and second parts include two optical fibres each for optical connection to a respective fibre of the other part.

The first part of the connector assembly includes a housing, referred to in U.S. Pat. No. 5,757,996 as an alignment sleeve insert, which has passageways for housing two optical connections between the fibres. Immediately prior to physical connection of the first and second parts of the assembly, the fibres of the first part of the connector assembly extend into the passageways of the housing and, during the physical connection of the second part of the assembly to the first part, the fibres of the second part of the connector are inserted into the passageways of the housing which thereby serves to bring the fibres into aligned confronting relationship so that a good optical connection can be established.

When it is desired to gain access to the ends of the fibres, the first and second parts of the assembly are separated from one another. The ends of the fibres of the second part are then immediately accessible but the fibres of the first part are housed within the passageways of the housing and are therefore not readily accessible. U.S. Pat. No. 5,757,996 seeks to overcome the problem by allowing for the housing to be movable outwardly from the first part along a rod, sufficiently far that it moves clear of the ends of the fibres. Thereafter the housing can be rotated about the longitudal axis of the rod so that the ends of the fibres of the first part are accessible.

The arrangement of U.S. Pat. No. 5,757,996 is advantageous in providing a means for moving the housing to a position in which it causes much less obstruction to the free ends of the fibres of the first part, and also in retaining the housing physically connected to the first part of the assembly so that it cannot be lost. On the other hand the arrangement, even though it is complicated and requires a two stage movement of the housing, takes up space within the assembly (the space taken up by the rod) and even in its least obstructing position does impede access to a region of the interior of the first part of the connector as well. Those problems become more severe as the number of optical connections that it is desired to make within the assembly increases.

It is an object of the invention to provide an improved form of connector assembly for making optical connections between a plurality of fibres in which free access to the ends of each of the plurality of fibres is readily obtainable without parts of the connector being detached.

According to the invention there is provided a fibre optic connector assembly including first and second connector parts that can be physically connected together and separated from one another, each connector part including a plurality of fibres, each for optical connection to a respective fibre of the other part, wherein a housing is provided within the assembly, the housing defining a plurality of passageways for housing respective optical connections of the fibres of the first and second connector parts and for maintaining the fibres of each optical connection in alignment, wherein the housing is tethered to the first connector part by an elongate flexible member.

The fibre optic connector is preferably so arranged that one end of the elongate flexible member is able to be enclosed by the plurality of fibres of the first connector part. Yet more preferably the fibre optic connector is so arranged that one end of the elongate flexible member is able to be located co-axially with a longitudinal axis of the first connector part, said longitudinal axis being aligned substantially parallel to the ends of the plurality of fibres in the first connector part.

The tether can be maintained during all routine operation of the assembly, including during separation of the housing from the first connector part to allow cleaning of the ends of the fibres of the first connector part. At the same time the tether can be sufficiently long that it is possible to avoid the housing obstructing the cleaning operation.

The elongate flexible member is preferably fixed at one end to the housing and preferably extends from the housing to a free end, the free end of the elongate flexible member being arranged such that it is prevented from passing all the way through an opening in the first connector part.

The end of the elongate flexible member opposite to the end fixed to the housing may be fixed to the first connector part (with a degree of slack in the elongate flexible member sufficient to allow the housing to be moved to a position where it does not obstruct cleaning) but it is preferably provided with a protuberance that is unable to fit through the opening of the wall of the first connector part. The elongate flexible member may be slidably located in the opening and the sliding connection may be sealed.

In this simple manner the housing may be reliably retained with the first connector part, but without impeding cleaning of the ends of the fibres.

The elongate flexible member is preferably in the form of a cord, although it may take other forms, such as that of an elongate strip if desired. The elongate flexible member may be made of any of a wide variety of materials including for example: stainless steel wire, fibreglass braid, braided aramid yarn or other materials.

Preferably, the first connector part includes an open ended cavity, the fibres project into the cavity towards the open end thereof and the housing is movable between a first operative position in which it is at least partly in the cavity with the passageways of the housing receiving respective fibres therein and a second cleaning position in which it is out of the cavity, the housing being tethered to the first connector part in both the first operative position and the second cleaning position.

Preferably the cavity is of generally cylindrical shape, the fibres project into the cavity towards the open end thereof in directions substantially parallel to the longitudinal axis of the generally cylindrical cavity and the housing extends across the open end of the cavity in its first operative position.

Usually a fastening system additional to the tethering by the elongate flexible member, is provided, the fastening system serving to releasably secure the housing in a fixed relationship to the first connector part.

The fastening system preferably comprises a screw threaded member that is screwed into a screw threaded hole in the first connector part. The elongate flexible member preferably is fixed to the screw threaded member and passes through the screw threaded hole when the screw threaded member is unscrewed.

The fibres of the first connector part preferably comprise a multiplicity of fibres spaced around a central axis of the first connector part.

The connector assembly may be of any of a wide variety of cross-sectional shapes but will usually be of either generally circular or generally rectangular cross-sectional shape. In the case of a connector assembly of generally circular shape, the fibres are preferably arranged around the central axis of each connector part in one or more rings with fibres within the same ring equiangularly spaced around the central axis of each connector part. Usually, each connector part will include at least five fibres.

The present invention also provides a fibre optic connector assembly including
  a first connector part,
  a second connector part, the first and second connector parts being able to be physically connected together and separated from one another,
  the first connector part including an open ended cavity and a plurality of fibres projecting into the cavity towards the open end thereof,
  the second connector part including an open ended cavity and a plurality of fibres projecting into the cavity towards the open end thereof,
  a housing defining a plurality of passageways for housing respective optical connections of the fibres of the first and second connector parts and for maintaining the fibres of each optical connection in alignment,
  a screw threaded member for securing the housing to the first connector part, the screw threaded member being screwed into a screw threaded opening in the first connector part, and
  an elongate flexible member fixed at one end to the screw threaded member and having a protuberance at its other free end, the protuberance being unable to pass through the screw threaded opening in the first connector part.

The present invention also provides a connector part for a fibre optic connector assembly, the connector part including a housing and the other features of the first connector part of the fibre optic connector assembly defined above.

The invention is of particular advantage in the case of a connector assembly situated on an aircraft. It can be very costly if, during routine maintenance, at a location where a replacement housing is not readily available, the housing is lost, since the communication channels passing through the connector then become unusable. Accordingly, the present invention still further provides an aircraft including a fibre optic communications arrangement comprising at least one connector assembly as defined above.

It should be understood that where reference is made to optical fibres of the first and second parts, those "fibres" will typically comprise, in the region of their connection, both the fibres themselves and other parts such as ferrules which may be provided around the fibres, especially in the region of their connection.

It should also be understood that the 'housing' referred to above, fulfils the same function as the part referred to as the 'alignment sleeve insert' in U.S. Pat. No. 5,757,996. The housing may also be referred to as an 'alignment block' and enables a good optical connection to be established between the optical fibres of the first and second connector parts.

By way of example an embodiment of the invention will now be described with reference to the accompanying drawings, of which:

FIG. 1 is an exploded perspective view of a known fibre optic connector assembly, FIG. 2 is a perspective view of a first part of a connector assembly embodying the invention, and FIG. 3 is a sectional view of a part of the first connector part shown in FIG. 2.

Referring first to FIG. 1, the known fibre optic connector assembly comprises a first connector part 1 and a second connector part 2. A plurality of optical fibres 3 terminate in the end of the first connector part 1 and the same number of fibres 4 terminate in the end of the second connector part 2. In the example shown there are sixteen fibres 3 and sixteen fibres 4.

The second connector part 2 has a cylindrical connecting portion 5 which is externally screw threaded. The first connector part 1 has a cylindrical connecting portion 6, which fits inside the connecting portion 5 of the second connector part, and also has a rotatably mounted collar 7 which is internally screw threaded and can be screwed onto the connecting portion 5 of the second connector part when it is fitted over the connecting portion 6 of the first connector part. In that manner a reliable and secure physical connection can be established between the first and second connector parts.

It is also important to establish a reliable optical connection between fibres of the first and second connection parts and to that purpose it is important that a fibre of the first connection part is accurately aligned with a fibre of the second connection part to which it is to be optically connected. For that purpose the end portions of the fibres in each connection parts are fixed at predetermined locations and are relatively rigid as a result of each fibre end portion being surrounded by a respective ceramic ferrule. In addition to the provision of that ferrule, a housing 8 is provided in which a plurality of ceramic sleeves 9, each defining a respective internal passageway, are fixed, each sleeve being dimensioned to receive in its passageway as a close fit the ends of an optical fibre of the first connector part 1 and an optical fibre of the second connector part 2. In that way a very precise alignment of the optical fibres can be obtained and therefore a good optical connection established between them.

The housing 8 has a securing screw 10 which, when the connector assembly is secured together, is screwed into a screw threaded hole 11 formed in a front face 12 of the first connector part 1. The housing 8 is then received within a cavity within the first connector part immediately in front of the front face 12. The screw 10 and the hole 11 are disposed along the central longitudinal axis of the connector. As will be understood, the optical fibre ends of the first connector part project from the front face 12 and project partway into the ceramic sleeves 9 of the housing 8 from one side when the connector parts 1, 2 are physically connected together. The optical fibre ends of the second connector part similarly project partway into the ceramic sleeves 9 of the housing 8 from the other side when the connector parts 1, 2 are physically connected together. In that way a reliable optical connection between fibre ends is established.

During use of the connector it may be necessary to dissemble the connector in order, for example, to clean the ends of the fibres. Such dissembly is easily accomplished by unscrewing the collar 7, after which the optical fibre ends of the second connector part 2 are exposed and accessible, and then unscrewing the screw 10 to allow the housing 8 to be removed, after which the optical fibre ends of the first connector part 1 are exposed and accessible. While the first and second connector parts remain attached to the optical fibres, the housing is, in the arrangement shown in FIG. 1, entirely unattached and there is therefore a risk of it being lost. That may be a particular problem if the connector is employed on an aircraft and the housing is lost during maintenance work at a remote location.

Referring now also to FIGS. 2 and 3, where corresponding parts are designated by the same reference numeral as in FIG. 1, there is shown a modification to the assembly in which the housing 8 is tethered to the first connector part 1 by an elongate flexible member which in this example is a braided stainless steel wire 15. One end of the wire 15 is fixed to the end of the screw 10, for example by forming a small recess in the end of the screw and soldering the wire in the recess (see FIG. 3). The other end of the wire 15 carries an end stop member 16 that is fixed to the wire 15 by crimping. The wire 15 passes freely through the hole 11 in the centre of the connector part 1, but the end stop member 16 is of such a size that it cannot pass through the hole 11. Consequently although the housing 8 can be moved to a position well clear of the optical fibre ends of the first connector part 1, it remains attached by the wire 15 and cannot therefore be lost. As shown in FIG. 2, a clip 17 is secured to the screw 10 to retain the screw assembly in position on the housing 8. (Such a clip is also present in the example shown in FIG. 1 but is not visible.)

It may be noted that, because the wire 15 is fixed to the end of the screw 10 and passes through the hole 11 which is in any case required for engaging the screw 10 when the housing is screwed onto the first connector part 1, the provision of the tether for the housing does not reduce the space available for optical fibre ends and thus does not reduce the capacity of the connector. Although in the example of FIGS. 2 and 3, only eight fibres terminate in each connector part, it would also be possible for there to be, say, fifteen fibres terminating in each part. The fibres may be arranged across the connector in a variety of patterns with some fibres close to the central axis of the connector and others towards the periphery. It may be noted that in FIG. 3 a section line is chosen through two of the fibres that are relatively close to the central axis of the connector.

Starting from the position shown in FIG. 2, the housing 8 can be installed in the first connector part 1 by a user pulling the end stop member 16 to draw the housing into the connector part 1. Then the screw 10 can be screwed into the hole 11 and the two parts 1, 2 of the connector assembly secured together by screwing up the collar 7. When dissembling, the collar 7 is unscrewed, the screw 10 unscrewed and then the housing moved away from the first connector part 1 just as in the example of the connector of FIG. 1 except that the housing 8 remains tethered to the wire 15 which is kept attached to the connector part 1 because the end stop member 16 is unable to pass through the hole 11. If it is required to detach the housing 8 completely, for example to replace or repair it, then the end stop member 16 can be cut off and a new member crimped to the end of the wire 15 in its place.

Whilst FIGS. 2 and 3 show one particular example of the invention, it should be understood that many modifications may be made to the arrangement shown. For example, the stainless steel wire may be replaced by other forms of cord or other elongate flexible member. Fibreglass braid, braided aramid yarn or other mixed or woven cords may be employed. Whether or not the material of the cord is steel or another material, other methods of fixing the cord to the screw 10 and other methods of fixing the end stop member 16 to the cord may be employed, including, as well as crimping and soldering, adhesive bonding, screwing and tying.

In the examples shown the connector assemblies are of circular cross-section but it should be understood that the invention can be applied to assemblies of rectangular cross-section or indeed of other complex cross-sections and to assemblies with more or fewer fibre connections.

In some cases it may be desirable for the interior of the connector assembly to be sealed. In such a case, a sealing member may be provided with the wire 15 slidably and sealingly received within the hole; such a member is shown in FIG. 3 and is indicated by the reference numeral 18. Another possibility is to provide a closed back cavity to the connecting part 1 and to accommodate the wire 15 in a tortuous shape within the cavity.

The invention claimed is:

1. A fibre optic connector assembly including first and second parts that can be physically connected together and separated from one another, each connector part including a plurality of optical fibres, each for optical connection to a respective optical fibre of the other part, wherein a housing is provided within the assembly, the housing defining a plurality of passageways for housing respective optical connections of the optical fibres of the first and second connector parts and for maintaining the optical fibres of each optical connection in alignment, wherein the housing is tethered to the first connector part by an elongate flexible member, the flexible member having one end fixed to the housing, the flexible member being associated with an opening in said first connector part, the flexible member extending from the housing to a free end of said flexible member, the free end not attached to the first connector part, the free end being arranged such that said free end is prevented from passing all the way though the opening in the first connector part.

2. A fibre optic connector assembly according to claim 1, wherein the free end of the elongate flexible member is provided with a protuberance that is unable to fit through the opening in the first connector part.

3. A fibre optic connector assembly according to claim 1, in which the elongate flexible member comprises a cord.

4. A fibre optic connector assembly according to claim 1, in which the fibres of the first connector part comprise a multiplicity of fibres spaced around a central axis of the first connector part.

5. A connector part for a fibre optic connector assembly, the connector part including a housing and the other features of the first connector part of the fibre optic connector assembly according to claim 1.

6. An aircraft including a fibre optic communications arrangement comprising at least one connector assembly according to claim 1.

7. A fibre optic connector assembly including first and second parts that can be physically connected together and separated from one another, each connector part including a plurality of optical fibres, each for optical connection to a respective optical fibre of the other part, wherein the first connector part includes an open ended cavity, the optical fibres projecting into the cavity towards the open end thereof, a housing is provided within the assembly, the housing defining a plurality of passageways for housing respective optical connections of the optical fibres of the first and second connector parts and for maintaining the optical fibres of each optical connection in alignment, the housing being movable between a first operative position in which it is at least partly in the cavity with the passageways of the housing receiving respective fibres therein and a second cleaning position in which it is out of the cavity, and the housing being tethered to the first connector part by an elongate flexible member in both the first operative position and the second cleaning position.

8. A fibre optic connector assembly according to claim 7, in which the cavity is of generally cylindrical shape and has a longitudinal axis, the optical fibres project into the cavity towards the open end thereof in directions substantially parallel to the longitudinal axis, and the housing extends across the open end of the cavity in its first operative position.

9. A connector part for a fibre optic connector assembly, the connector part including a housing and the other features of the first connector part of the fibre optic connector assembly according to claim 7.

10. An aircraft including a fibre optic communications arrangement comprising at least one connector assembly according to claim 7.

11. A fibre optic connector assembly including first and second parts that can be physically connected together and separated from one another, each connector part including a plurality of optical fibres, each for optical connection to a respective fibre of the other part, wherein a housing is provided within the assembly, the housing defining a plurality of passageways for housing respective optical connections of the optical fibres of the first and second connector parts and for maintaining the optical fibres of each optical connection in alignment, wherein the housing is tethered to the first connector part by an elongate flexible member, and a fastening system, additional to the tethering by the elongate flexible member, is provided, the fastening system serving to detachably secure the housing in a fixed relationship to the first connector part.

12. A fibre optic connector assembly according to claim 11, in which the fastening system comprises a screw threaded member that is screwed into a screw threaded hole in the first connector part.

13. A fibre optic connector assembly according to claim 12, in which the elongate flexible member is fixed to the screw threaded member and passes through the screw threaded hole when the screw threaded member is unscrewed.

14. A connector part for a fibre optic connector assembly, the connector part including a housing and the other features of the first connector part of the fibre optic connector assembly according to claim 11.

15. An aircraft including a fibre optic communications arrangement comprising at least one connector assembly according to claim 11.

16. A fibre optic connector assembly including
a first connector pad,
a second connector part, the first and second connector parts being able to be physically connected together and separated from one another,
the first connector part including an open ended cavity and a plurality of fibres projecting into the cavity towards the open end thereof,
the second connector part including an open ended cavity and a plurality of fibres projecting into the cavity towards the open end thereof,
a housing defining a plurality of passageways for housing respective optical connections of the fibres of the first and second connector parts and for maintaining the fibres of each optical connection in alignment,
a screw threaded member for securing the housing to the first connector part, the screw threaded member being screwed into a screw threaded opening in the first connector part, and
an elongate flexible member fixed at one end to the screw threaded member and having a protuberance at its other free end, the protuberance being unable to pass through the screw threaded opening in the first connector part.

17. A connector part for a fibre optic connector assembly, the connector part including a housing and the other features of the first connector part of the fiber optic connector assembly according to claim 16.

18. An aircraft including a fibre optic communications arrangement comprising at least one connector assembly according to claim 16.

* * * * *